United States Patent
Smith et al.

(10) Patent No.: US 11,729,165 B2
(45) Date of Patent: Aug. 15, 2023

(54) DEVICE AUTHORIZATION SYSTEMS

(71) Applicant: Plantronics, Inc., Santa Cruz, CA (US)

(72) Inventors: Euan Christopher Smith, Cambridge (GB); Julian Hall, Cambridge (GB)

(73) Assignee: Plantronics, Inc., Santa Cruz, CA (US)

(*) Notice: Subject to any disclaimer, the term of this patent is extended or adjusted under 35 U.S.C. 154(b) by 386 days.

(21) Appl. No.: 16/764,722

(22) PCT Filed: Nov. 19, 2018

(86) PCT No.: PCT/GB2018/053344
§ 371 (c)(1),
(2) Date: May 15, 2020

(87) PCT Pub. No.: WO2019/097258
PCT Pub. Date: May 23, 2019

(65) Prior Publication Data
US 2021/0176247 A1   Jun. 10, 2021

(30) Foreign Application Priority Data
Nov. 17, 2017   (GB) ...................................... 1719080

(51) Int. Cl.
*H04L 29/06*   (2006.01)
*H04L 9/40*   (2022.01)
(Continued)

(52) U.S. Cl.
CPC ...... *H04L 63/0876* (2013.01); *H04L 63/0236* (2013.01); *H04L 63/0807* (2013.01);
(Continued)

(58) Field of Classification Search
None
See application file for complete search history.

(56) References Cited

U.S. PATENT DOCUMENTS

2007/0269105 A1   11/2007   Zhang et al.
2013/0191884 A1   7/2013   Leicher et al.
(Continued)

FOREIGN PATENT DOCUMENTS

| CA | 2571273 A1 * | 6/2005 | |
| CA | 2721559 A1 * | 5/2011 | ............. G06F 21/10 |

(Continued)

*Primary Examiner* — Richard A McCoy
(74) *Attorney, Agent, or Firm* — Quarles & Brady LLP

(57) ABSTRACT

A method of distributed authorization of one or more client applications to one or more connected devices. The method comprises: receiving at a connected device, from a browser executing a client application, a client token and an access request. The client token has been provided to the client application by a process comprising generating one or more client tokens, one for each of one or more client applications (a client token defines permissions for a client application and a domain hosting the client application); signing the client tokens with a private key of a client token issuer, and distributing the client tokens to the client applications; verifying a signature of the client token using a public key of the client token issuer; determining whether the client token grants the client application permission for the access request and, if permission is granted: replying to the browser with a redirect response including an access token granting permission for the client application to access the connected device and identification of the domain hosting the client application from the client token; and executing the redirect response with the browser to make the access token available to the client application for use by the client application when requesting the connected device to perform a task.

20 Claims, 4 Drawing Sheets

(51) Int. Cl.
 *H04W 12/63* (2021.01)
 *H04W 12/30* (2021.01)

(52) U.S. Cl.
 CPC .......... *H04L 63/107* (2013.01); *H04W 12/30* (2021.01); *H04W 12/63* (2021.01)

(56) References Cited

U.S. PATENT DOCUMENTS

| | | | |
|---|---|---|---|
| 2014/0189839 A1* | 7/2014 | Jezek | H04L 63/0815 |
| | | | 726/8 |
| 2015/0009248 A1* | 1/2015 | Bracalente | G06F 21/16 |
| | | | 345/691 |
| 2016/0086108 A1 | 3/2016 | Abelow | |
| 2017/0142108 A1 | 5/2017 | Zhang et al. | |
| 2018/0091355 A1* | 3/2018 | Tamura | H04L 67/563 |
| 2018/0284907 A1 | 10/2018 | Kolahdouzan | |

FOREIGN PATENT DOCUMENTS

| | | | | | |
|---|---|---|---|---|---|
| CN | 102567903 | B | * | 7/2012 | |
| DE | 102008024783 | A1 | * | 12/2009 | .......... G06F 21/335 |
| JP | 2015027033 | A | * | 2/2015 | |
| WO | 2016/154660 | A1 | | 10/2016 | |

* cited by examiner

| CLI Token | Who signs and which key used (ID) |
|---|---|
| CLIENT CONSTRAINTS:<br>• ACCESS SCOPE = ROLE/TASK<br>• NETWORK TTPS CLIENT CAN USE<br>    LAN, WAN, PUBLIC NOT (VPN)<br><br>   o (WHAT IT CAN DO)<br>   o (HOW IT CAN COMMUNICATE)<br>   o DOMAIN : ORIGIN OF CLIENT | |

Fig. 4

DEVICE AUTHORIZATION SYSTEMS

FIELD

This specification relates to device authorization systems, for example for image capture devices.

BACKGROUND

An image capture device for live whiteboard sharing is described in WO2016/128761; there may be many installed devices. Some examples of the device are accessed with a web browser and thus provide a web interface. It is therefore desirable to control access to the devices. The devices should preferably be able to operate autonomously, that is without requiring continuous access to an authorization server or similar.

SUMMARY

A method of distributed authorization of one or more client applications to one or more connected devices may thus comprise generating one or more client tokens, one for each of the one or more client applications. The connected devices may be connected for access via a web browser via a local or wide area network and/or the Internet. As used herein a web browser is any software which accesses information using the Hypertext Transfer Protocol (HTTP) or a subsequent development thereof.

A client token defines permissions for a client application and also a domain hosting the client application. The domain may be identified by a domain name. The client tokens are signed with a private key of a client token issuer and distributed to the client applications. A client application may be retrieved from a domain of the client application domain by the web browser. The client application may contain code such as JavaScript which may be executed by the web browser.

The method may further comprise the connected device receiving a client token and an access request from a browser executing the client application. The access request may, but need not be, associated with a task which the client application wishes the connected device to perform.

The connected device may then verify a signature of the client token using a public key of the client token issuer. Having verified the client token information in the client token may be used by the device for determining whether to grant the client application permission for the access request.

If permission is granted the connected device may reply to the browser with a redirect response. The redirect response may include an access token granting permission for the client application to access the connected device and identification of the domain hosting the client application from the client token. The method may then further include executing the redirect response with the browser to make the access token available to the client application for use by the client application when requesting the connected device to perform a task.

An advantage of some implementations of the method is that because the redirect response identifies the domain hosting the client application as that specified in the client token, the client application can only retrieve or be provided with the access token if it is on this same domain. This limitation is effectively imposed by the browser and is a condition implicit in a redirect response. Thus the client application is constrained to work on the same domain as that specified in the client token, and the device can trust the token client because this is signed with a secret key. This can therefore increase the security of use of the connected device by a client application.

Another advantage arises because the information the device needs to trust the application is provided on a signed client token. This token may be embedded in the application or otherwise made accessible to the application. The public key of the client token issuer may similarly be embedded in or otherwise made accessible to the device. Thus the device can establish that the client application can be trusted without the device needing to communicate back to a central authorization server or to the client token issuer. The device merely needs to receive the client token from the application and have access to the issuer's public key. This facilitates the deployment of large numbers of devices because it avoids the need for all the devices to be able to communicate with a central authorization server.

In effect permission to grant access to a client application is delegated to a device. This could be achieved by installing a client token in a device but this would lack flexibility to accommodate new applications. Instead implementations of the method we describe achieve this in a flexible manner which facilitates adding new client applications even where these applications and their client tokens have not previously been seen by a device.

In some approaches the redirect response may direct the browser towards the domain specified in the client token. For an authentic access request this should be the same domain as that of the client application. The browser may fetch a further response from this domain which may include code to be executed by the browser, for example as part of a web page. The access token may be extracted from the redirect response prior to fetching the further response. For example the redirect response may include a hypertext fragment comprising the access token, for example in the form of a string of characters following a fragment identifier such as a hash. The browser may strip off the hypertext fragment or access token prior to fetching the further response and this may remain stored at or associated with the browser.

The further response may then be executed to pass a message containing the access token, which may be stored at the browser, to the client application. This may only be permitted if the client application is in the same domain as the domain from which the further response is fetched. Thus in some implementations the client application must be in the same domain as the domain identified in the client token for the client application to have access to the access token which controls whether the client application is able to use the device to perform a task.

In some other approaches the redirect response may include a redirect URL (Uniform Resource Locator) and may direct the browser towards the redirect URL to fetch a further response. The further response may comprise code, for example in a web page. Again the access token may be extracted from the redirect response prior to fetching the further response; the access token may again be part of a fragment stripped off the redirect response and stored prior to fetching the further response. In this case the redirect URL need not be in the same domain as the client application. Instead the domain specified in the client token may be provided as a parameter to the further response, either as part of the redirect URL or after fetching the further response. In some implementations the parameter may be passed as a callback method. The further response may then be executed at the browser to read the access token and to pass or broadcast the access token to the domain specified in the client token. Again the client application is thus required to have the same domain as that specified in the client token. The redirect URL may point to any server but in some implementations it directs the browser towards the connected device, which may host a web server.

In some preferred implementations the method may include one or more further authentication steps prior to granting access/task permission to the client application.

For example in some embodiments the method/system may also determine whether a user is locally present at the connected device to determine whether permission for the access request is granted. This may be implemented by software running on the device and may involve the connected device determining whether the user is locally present by requiring the user: to press a button on the device; or to identify themselves, for example by a fingerprint swipe, facial or other biometric identification, or code or username and/or password; or to provide an access code in a similar manner which need not identify the user personally; or to swipe a card or interact with an NFC (Near-Field Communication) device which may be a smartphone. A user interface to determine whether the user is locally present may be a user interface on the device or a user interface with a wired or wireless connection to the device, preferably co-located with the device. The user interface may comprise, for example, one or more of a physical or virtual button or keypad, a camera, a fingerprint sensor, a swipe or other card interface, and an NFC interface. This is particularly useful where the connected device comprises an image capture device such as a camera for whiteboard sharing.

Additionally or alternatively one or more further authentication steps may be implemented by one or more further redirects prior to making the access token available to the client application.

In more detail this may involve the device replying to the browser with an additional redirect response to redirect the browser to an authentication service prior to replying to the browser with the redirect response including the access token. The browser may receive an authentication response from the authentication service with a redirect response to redirect the browser to the connected device. The device may then validate the authentication response prior to replying to the browser with the redirect response including the access token. One or more further similar redirects may be included to include one or more further authentication steps in the procedure.

The authentication service may implement a further condition for the client application to be granted permission to access the device. For example the authentication service may determine whether a user is locally present at the connected device, for example as previously described. Thus again this may involve the user pressing a button on the device or interacting with the device in some other way, or it may involve the user pressing a button or typing a code on a keypad of a local authentication device such as a keypad, or interacting with the local authentication device in some other way, for example via a fingerprint swipe. Again this is particularly useful where the device comprises an image capture device such as a whiteboard sharing device, for improved security.

Additionally or alternatively the authentication service may implement some other condition, for example a requirement for a login, for example to a corporate network, or a time-based or location-based condition. The authentication service may be implemented by the connected device or by any other device, for example a mobile device, network terminal or the like.

The access token provided to the client application may be signed by the connected device. This facilitates trust in the access token by the device. Additionally or alternatively the access token may be time-limited.

The method may include the client application providing the access token to the connected device when requesting the device to perform a task, for example via an API (Application Programming Interface). The device may then verify the access token prior to performing the task. The verifying may comprise checking that the task is within one or more constraints specified by the client token. The constraints may specify, for example, a set of permitted roles or tasks for the client application and/or one or more permitted communication methods such as a network type (local area network, wide area network, public network, VPN (Virtual Private Network), and so forth). The verifying may also include checking a signature of the token where the token is signed.

In some preferred implementations the connected device comprises a whiteboard image capture/sharing device. Then the access request may comprise a request to access an image captured by such a device and/or the task may comprise sending an image from the device to the client application. Such a whiteboard sharing apparatus may comprise a camera to be directed to capture an image from a whiteboard, and signal processing apparatus coupled to the camera. The signal processing apparatus may be configured to input, process, and make available for transmission to the client application, camera data for a succession of image frames of the whiteboard In another aspect there is provided the browser-implemented part of a method as described above.

In another aspect there is provided the device-implemented part of a method as described above.

In another aspect there is provided a system comprising a plurality of devices including at least one connected device and at least one further device configured to implement a web browser. The system further comprises code to control the devices to implement a method as described above.

In another aspect there is provided one or more computer storage media carrying processor control code to implement a method as described above.

Aspects of the method may be implemented, for example on a general purpose computer system, on a digital signal processor (DSP), on a server, for example in the cloud, on a mobile device, and/or on the connected device, for example the image capture device.

The code may be provided on a non-transitory physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

No doubt many other effective alternatives will occur to the skilled person. It will be understood that the invention is not limited to the described embodiments and encompasses modifications apparent to those skilled in the art lying within the spirit and scope of the claims appended hereto.

BRIEF DESCRIPTION OF THE DRAWINGS

These and other aspects of the invention will now be further described by way of example only, with reference to the accompanying figures, wherein like numerals refer to like parts throughout, and in which:

FIG. 4 shows a client token suitable for use in a method of authorization of a client application to a connected device according to embodiments of the present disclosure.

DETAILED DESCRIPTION OF PREFERRED EMBODIMENTS

Figure 1:
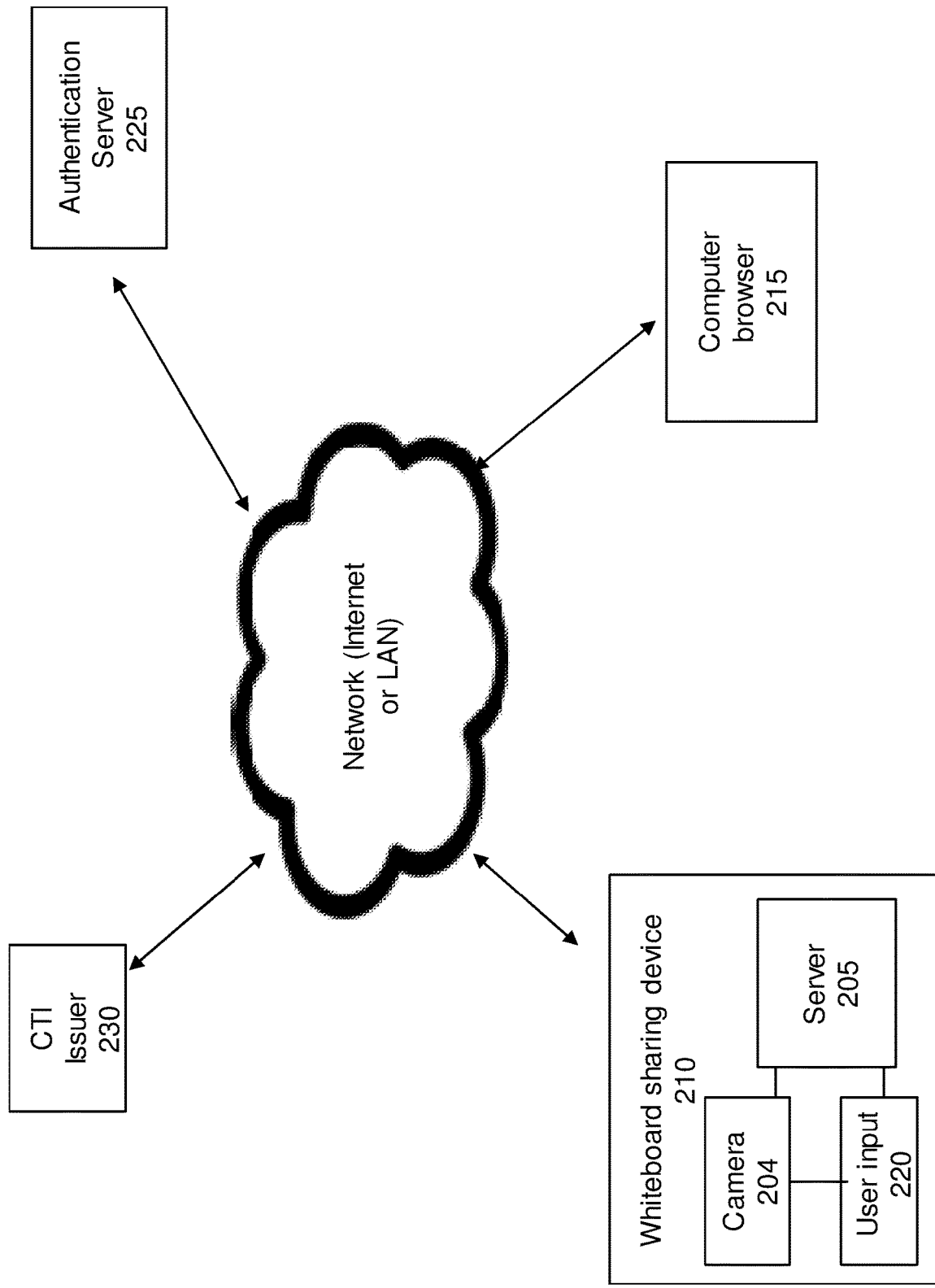
FIG. 1 shows an example whiteboard sharing system for implementing the techniques described herein.

FIG. 1 shows an exemplary device with which the techniques described herein may be used. The device is a whiteboard sharing device, which has a camera 204, a server, and a user input. The camera 204 may be an acute angle camera for viewing a whiteboard (not shown). The whiteboard is mounted at a wall, and the camera 204 is, in this example, mounted via support on wall. It will be appreciated that this is merely an exemplary configuration of whiteboard and camera, and various alternative configurations may be exploited in which whiteboard is located in the field of view of camera 204.

For the avoidance of doubt references in this specification to a 'whiteboard' include other similar surfaces which may be used for writing, drawing or similar, typically but not necessarily using a dry eraser. Thus 'whiteboard' includes white, write-on walls, glass panels intended for a similar purpose to a whiteboard, and the like. A "whiteboard" is generally, but not necessarily white.

The whiteboard sharing device has a user input device which may be in the form of a button. This is used to identify that a user is located at the whiteboard sharing device.

The whiteboard sharing device also has a server 205. This is for hosting the images from the camera.

The system also has a network for communication between components of the system. In this example, the camera captures an image which is transmitted to an external browser or client. The browser may be on a computer, which includes a browser or application on a mobile phone.

In this example, the whiteboard sharing device is connected to a network such as the internet or a LAN network. In this example, a personal computer 215 and a server, respectively, are in bidirectional communication with the network.

To facilitate understanding of example uses of the techniques herein, an illustrative whiteboard sharing device/system will now be further described.

Thus a system/method of capturing writing or drawing on a whiteboard may comprise (modules for): inputting camera data for a succession of image frames from a camera directed towards the whiteboard; user filter processing data from the image frames to remove parts of a user or user pen writing or drawing on said whiteboard, e.g. by filtering to distinguish between motion of said user/user pen parts in said image frames and writing/drawing image information in said image frames which appears or changes during said writing or drawing but which is thereafter substantially unchanging. The image data may also be distortion-compensated, before and/or after filtering, to compensate for acute angle viewing of the whiteboard by the camera. The system/method may then output writing/drawing data which defines captured writing/drawing on the whiteboard.

Such a system/method is typically employed for sharing information written or drawn on a whiteboard, for example by sending the writing/drawing data derived from the image processing over a wired or wireless network for viewing, printing or the like at a remote location. However the captured information may be processed in other ways, for example by printing, storing in (non-volatile) memory, post-processing by an object or handwriting recognition system, and the like. The captured and output data may be dynamic in the sense that the writing/drawing may be captured as a quasi-continuous process. The output writing/drawing data may thus comprise a data stream, e.g. in real time, showing the evolution of the subject matter written/drawn onto and/or erased from the whiteboard. This data may be shared in any convenient manner. It will be appreciated that maintaining privacy of this data is important.

The image processing may be performed on the image capture device (typically a camera), or otherwise in or local to the whiteboard sharing device.

The system also has a client token issuer. The client token issuer is a trusted source that issues the client tokens and signs them with a private key. The client token issuer may be a server that issues the tokens; in some implementations the tokens may be generated manually and then issued electronically. The authentication server, which may be part of the connected device, verifies the signature of the client token using a public key. The connected device may be manufactured with the public key inherently built in, for example, in non-volatile storage.

The system further has an authentication server. The authentication server holds the public key, and checks the private key using the public key. In this example, the authentication server may be the server 205 on the whiteboard sharing device, or may be a separate server. The authentication server trusts the client token issuer; this may be achieved by exchange of keys or in some other manner.

Authentication may involve a third party, which may have a separate authentication server. In this example, the third party has a separate public key and private key; in this case the public key is not built into the connected device.

As a result of completing authorisation, the redirect URL contains a token. The token is contained within the fragment of the URL. This prevents the token being sent to the server or application, and the token stays within the browser.

Figure 2:
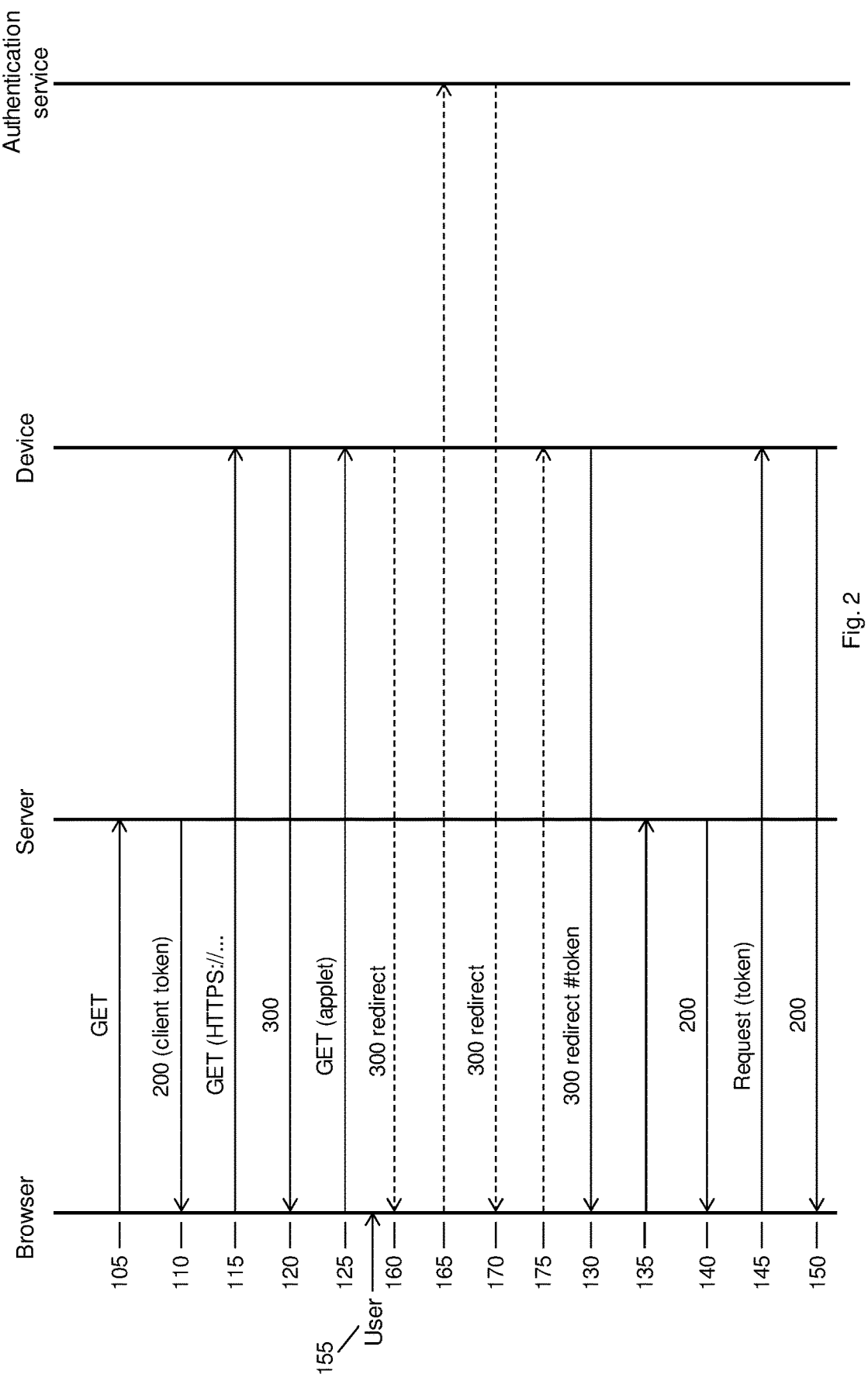
FIG. 2 shows an exemplary method of authorization of a client application to a connected device according to embodiments of the present disclosure.

FIG. 2 shows an exemplary method of authorization of a client application to a connected device, such as the image capture device of FIG. 1, according to embodiments of the present disclosure. In this example the browser is a web browser through which a user would like access to the content from the device.

In step 110 the method includes a client token being provided to a client application within the web browser. The client token is described later with reference to FIG. 4.

The server may issue a 200 Series return code when providing the client token, indicating that the requested action has been successfully completed.

In step 115 the device receives from the browser the client token. In step 120 the server may issue a 300 Series return code indicating that the command has been accepted, but the requested action is pending receipt of further information. In step 125 the device receives an access request from the browser. The browser verifies the signature of the client token using a public key of the client token issue, and determines whether the client token grants the browser permission to access the device.

If permission for access is granted, in step 130 the device replies to the browser with a redirect response. The redirect response includes an access token granting permission for the browser to access the connected device. The redirect response may include a hypertext fragment comprising the access token, for example in the form of a string of characters following a fragment identifier such as a hash.

Executing the redirect response may include passing the access token to and/or fetching a further response from the server (domain) hosting the client application, as shown in steps 135 and 140.

The browser then executes the redirect response in step 145, making the access token available for use when requesting the device to perform a task. As the browser has the access token, the device returns a 200 Series return code when indicating that the requested action has been successfully completed.

In this embodiment, authorization uses a determination of whether the user is locally present at the connected device, shown in step 155. This can be carried out by the user pressing a button on the device, identifying themselves, providing an access code, swiping a card of interacting with a NFC device. This may be a login, for example to a specific network or a time or location based condition.

In order to grant access, the redirect response may redirect the browser to an authentication service prior to providing the redirect response with the access token. Further authentication steps may be implemented by further redirects prior to making the access token available. In step 160 the device replies to the browser with an additional redirect response, redirecting the browser to an authentication service. This redirect response is executed in step 165.

In step 170 the browser receives an authentication redirect response from the authentication service, to redirect the browser to the connected device. The browser executes this redirect response in step 175. The device then validates the authentication response, and replies with the redirect response including the access token (as shown in step 130).

Figure 3:
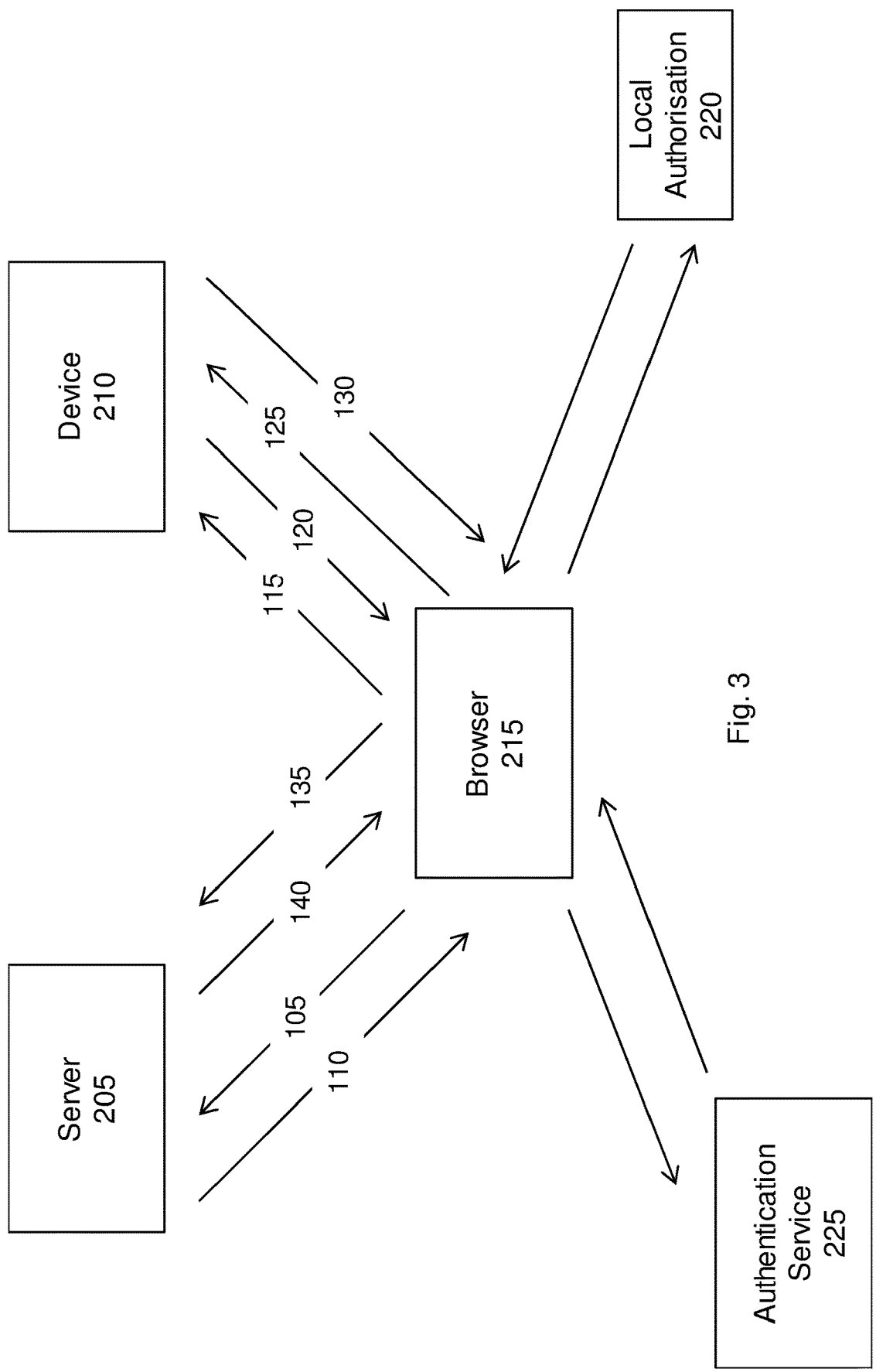
FIG. 3 shows an exemplary system for implementing a method of authorization of a client application to a connected device according to embodiments of the present disclosure.

FIG. 3 shows an exemplary system for implementing a method of authorization of a client application to a connected device according to embodiments of the present disclosure. The system has an application 205, a device 210, and a browser 215. The device may also have a local authorisation system 220.

The device 210 is the connected device, in this embodiment this is a live whiteboard sharing device. (resource owner)

The application 205 is a server or application hosting the data from the device. In this embodiment the server may also be part of the connected device. This allows a user to interact directly with the device if it knows the relevant IP address. This allows the device to be used in an environment without internet access.

The local authorisation 220 may be, for example, a button on the connected device or separate to the connected device, or a network for the user to connect to. The authorisation may be a further server through which authorisation is deferred.

The browser 215 is a browser or application that is requesting access to the connected device.

FIG. 4 shows a client token suitable for use in a method of authorization of a client application to a connected device according to embodiments of the present disclosure.

The client token may comprise data defining one or more constraints on the client (browser), e.g. data defining permitted access, tasks or role of the client device, for example encoded as a one-hot vector. For example where the device is an image capture device (Kaptivo) the client constraints may include whether the browser is permitted to see content on the whiteboard.

The client token may additionally or alternatively comprise data defining a type of network which the client is permitted to use e.g. a LAN, WAN, or Public (non-VPN) network.

The client token may additionally or alternatively comprise data defining permitted actions of the client (browser). For example, where the device is a whiteboard sharing device there may be two primary permitted groups of actions, with different privileges.

The first group of actions may include setup actions, for example modifying a password, and configuring settings. Access to carry out these actions requires administration privileges.

The second group of actions may include user actions, for example viewing and storing the captured images from the whiteboard sharing device. Access to carry out these actions requires client privileges.

The client token may additionally or alternatively comprise data defining permitted modes of communication of the client (browser). For example, users may only use administration privileges over a local network, however users may use client privileges over the internet. Generally, the lower the level of permitted actions, the greater the level of communication modes available. This allows remote users access to view captured images from the whiteboard sharing device, but does not allow remote users to alter configuration settings.

In implementations the client token includes data defining a (web) domain i.e. an origin of the client. This helps to inhibit stealing/impersonation of the client token. Therefore, for example, only browser webpages in the same domain may access information from other webpages in the same domain.

Thus in implementations, the client token is of no value to a client that is not on a specified correct domain. For example, if a third party has access to the client token, the third party may request access to the device using the client token, from a third party domain. However, the device redirects the browser to a specified webpage on a permitted domain. The third party domain is not the same domain as the permitted domain, and therefore the third party webpage will not be able to access the connected device.

In implementations the client token includes data defining which entity signed the token, and using which key, i.e. a key identifier. There may be multiple client token issuers, and therefore multiple public keys and private keys. The client may be refused access if the client token is signed by a different entity, or may forward the access request to the correct entity.

The Client token of FIG. 4 may be provided to the connected device by a process of generating the token, for example by a client token issuer (CTI), signing the token with a private key of the CTI, and then distributing the token. For example the token may be requested by the device and the signed token returned to the device. The token may be a JSON web token; it may be decentralized.

It will be understood that the invention is not limited to the described embodiments and encompasses modifications apparent to those skilled in the art lying within the scope of the claims appended hereto.

The invention claimed is:

1. A method of distributed authorization, comprising:
receiving, by a connected device from a browser executing a client application, a client token and an access request, the client token defining permissions for the client application and a domain hosting the client application, and the client token including a signature generated using a private key of a client token issuer associated with the client token;

verifying, by the connected device, the signature of the client token using a public key of the client token issuer;

determining, by the connected device, that the client token grants the client application permission for the access request responsive to verifying the signature of the client token using the public key of the client token issuer;

generating, by the connected device, an access token that grants the client application permission for the access request and includes an identification of the domain hosting the client application; and replying, by the connected device, to the browser with a redirect response including the access token, wherein:
the redirect response is executable by the browser to make the access token available to the client application for use by the client application when requesting the connected device to perform a task; and
the redirect response, upon execution by the browser, causes the browser to pass the access token to the domain hosting the client application using the identification of the domain hosting the client application from the access token.

2. The method of claim 1, wherein the redirect response, upon execution by the browser, causes the browser to fetch a further response from the domain hosting the client application as defined in the client token.

3. The method of claim 2, wherein the further response, upon execution by the browser, causes the browser to pass a message comprising the access token to the client application.

4. The method of claim 1, wherein:
the redirect response, upon execution by the browser, causes the browser to fetch a further response from a redirect URL and pass the access token to the domain hosting the client application as defined in the client token; and
the redirect URL defines a URL associated with the connected device.

5. The method of claim 1, wherein determining, by the connected device, that the client token grants the client application permission for the access request responsive to verifying the signature of the client token using the public key of the client token issuer comprises determining, by the connected device without communicating with the client token issuer, that the client token grants the client application permission for the access request responsive to verifying the signature of the client token using the public key of the client token issuer.

6. The method of claim 1, further comprising signing, by the connected device, the access token.

7. The method of claim 1, further comprising:
replying, by the connected device, to the browser with an additional redirect response, wherein the additional redirect response, upon execution by the browser, causes the browser to redirect to an authentication service;
receiving, by the connected device from the browser, an authentication response generated by the authentication service; and validating, by the connected device, the authentication response prior to replying to the browser with the redirect response including the access token.

8. An electronic device, comprising:
memory; and
at least one processor configured to:
receive, from a browser executing a client application, a client token and an access request, the client token defining permissions for the client application and a domain hosting the client application, and the client token including a signature generated using a private key of a client token issuer associated with the client token;
verify the signature of the client token using a public key of the client token issuer;
determine that the client token grants the client application permission for the access request responsive to verifying the signature of the client token using the public key of the client token issuer;
generate an access token that grants the client application permission for the access request and includes an identification of the domain hosting the client application; and
reply to the browser with a redirect response including the access token, wherein:
the redirect response is executable by the browser to make the access token available to the client application for use by the client application when requesting the device to perform a task; and
the redirect response, upon execution by the browser, causes the browser to pass the access token to the domain hosting the client application using the identification of the domain hosting the client application from the access token.

9. The device of claim 8, further comprising a camera mounted via support on a wall for capturing images of a whiteboard, wherein the at least one processor is further configured to process the images captured by the camera and store historical whiteboard content in the memory.

10. The device of claim 9, wherein the access request comprises a request to access the historical whiteboard content.

11. The device of claim 8, wherein:
the redirect response, upon execution by the browser, causes the browser to fetch a further response from the domain hosting the client application as defined in the client token; and
the further response, upon execution by the browser, causes the browser to pass a message comprising the access token to the client application.

12. The device of claim 8, wherein:
the redirect response, upon execution by the browser, causes the browser to fetch a further response from a redirect URL and pass the access token to the domain hosting the client application as defined in the client token; and
the redirect URL defines a URL associated with the electronic device.

13. The device of claim 8, wherein the at least one processor is configured to determine that the client token grants the client application permission for the access request responsive to verifying the signature of the client token using the public key of the client token issuer by determining, without communicating with the client token issuer, that the client token grants the client application permission for the access request responsive to verifying the signature of the client token using the public key of the client token issuer.

14. The device of claim 8, wherein the at least one processor is configured to sign the access token.

15. The device of claim 8, wherein the at least one processor is further configured to:
reply to the browser with an additional redirect response, wherein the additional redirect response, upon execution by the browser, causes the browser to redirect to an authentication service;
receive, from the browser, an authentication response generated by the authentication service; and
validate the authentication response prior to replying to the browser with the redirect response including the access token.

16. A non-transitory computer-readable medium having instructions stored thereon that, when executed by at least one processor, cause the at least one processor to implement operations comprising:
receiving, from a browser executing a client application, a client token and an access request, the client token defining permissions for the client application and a domain hosting the client application, and the client token including a signature generated using a private key of a client token issuer associated with the client token;
verifying the signature of the client token using a public key of the client token issuer;
determining that the client token grants the client application permission for the access request responsive to verifying the signature of the client token using the public key of the client token issuer;
generating an access token that grants the client application permission for the access request and includes an identification of the domain hosting the client application; and
replying to the browser with a redirect response including the access token, wherein:
the redirect response is executable by the browser to make the access token available to the client application for use by the client application when requesting the at least one processor to perform a task; and
the redirect response, upon execution by the browser, causes the browser to pass the access token to the domain hosting the client application using the identification of the domain hosting the client application from the access token.

17. The computer-readable medium of claim 16, wherein:
the redirect response, upon execution by the browser, causes the browser to fetch a further response from the domain hosting the client application as defined in the client token; and
the further response, upon execution by the browser, causes the browser to pass a message comprising the access token to the client application.

18. The computer-readable medium of claim 16, wherein:
the redirect response, upon execution by the browser, causes the browser to fetch a further response from a redirect URL and pass the access token to the domain hosting the client application as defined in the client token; and
the redirect URL defines a URL associated with the at least one processor.

19. The computer-readable medium of claim 16, wherein determining that the client token grants the client application permission for the access request responsive to verifying the signature of the client token using the public key of the client token issuer comprises determining, without communication with the client token issuer, that the client token grants the client application permission for the access request responsive to verifying the signature of the client token using the public key of the client token issuer.

20. The computer-readable medium of claim 16, the operations further comprising:
replying to the browser with an additional redirect response, wherein the additional redirect response, upon execution by the browser, causes the browser to redirect to an authentication service;
receiving, from the browser, an authentication response generated by the authentication service; and
validating the authentication response prior to replying to the browser with the redirect response including the access token.

* * * * *